United States Patent [19]

Scheiter et al.

[11] Patent Number: 5,373,181
[45] Date of Patent: Dec. 13, 1994

[54] SENSOR FOR SENSING FINGERPAINTS AND METHOD FOR PRODUCING THE SENSOR

[75] Inventors: Thomas Scheiter; Markus Biebl; Helmut Klose, all of Munich, Germany

[73] Assignee: Siemens Aktiengesellschaft, Munich, Germany

[21] Appl. No.: 142,713

[22] Filed: Oct. 25, 1993

[30] Foreign Application Priority Data

Oct. 26, 1992 [DE] Germany .................... 4236133

[51] Int. Cl.⁵ .................... H01L 29/04; H01L 21/44
[52] U.S. Cl. .................... 257/415; 257/417; 257/418; 257/419; 257/754; 257/756; 257/618; 437/190; 437/197; 437/228; 437/233; 437/901
[58] Field of Search ............ 257/415, 417, 418, 419, 257/754, 756, 618; 437/190, 192, 228, 233, 901

[56] References Cited

U.S. PATENT DOCUMENTS

| 3,440,873 | 4/1969 | Eichelberger | 257/415 |
| 4,203,128 | 5/1980 | Guckel et al. | 257/415 |

FOREIGN PATENT DOCUMENTS 0041693 12/1981 European Pat. Off. .
0071269 2/1983 European Pat. Off. .

*Primary Examiner*—Edward Wojciechowicz
*Attorney, Agent, or Firm*—Hill, Steadman & Simpson

[57] ABSTRACT

A grid-like arrangement of membranes of doped polysilicon are mounted on a substrate but are electrically insulated therefrom each membrane extends over a cavity and is joined to the substrate at at least two supporting locations so that they cavity lies between the membrane and the substrate. Changes in an electrical quantity existing between the membranes and the substrate are measured as forces exerted on the grid-like arrangement of sensor elements so that the ridges in the skin on a finger tip may be sensed for detecting a fingerprint.

19 Claims, 2 Drawing Sheets

SENSOR FOR SENSING FINGERPAINTS AND METHOD FOR PRODUCING THE SENSOR

BACKGROUND OF THE INVENTION

1. Field of the Invention

The present invention is related generally to a sensor for digitizing fingerprints and to a method for producing the fingerprint sensor.

2. Description of the Related Art

In order to automate the comparison of fingerprints to one another, it is required that the fingerprints be digitized and the digital image thereof stored.

Up to now, fingerprints have been obtained for automatic comparison by inking the tip of a finger and then applying the inked finger tip to a printing medium such as paper to produce a positive image of the line structure of the fingerprint. The fingerprint is then digitized using an image acquisition apparatus, such as, for example, a CCD camera or a scanner, for storage in memory.

SUMMARY OF THE INVENTION

An object of the present invention is to provide a sensor for sensing fingerprints for subsequent storage without requiring inking of the finger.

Another object of the invention is to provide a method for producing a fingerprint sensor.

These and other objects and advantages of the invention are provided by a sensor arrangement having a substrate of silicon on the surface of which is mounted a grid-like arrangement of polysilicon membranes which are electrically insulated from the substrate. Each membrane defines a cavity between the membrane and the surface of the substrate and each membrane is joined to the substrate by at least two supporting locations. Both the surface of the substrate on which the membranes are mounted and the membranes themselves are doped and are, thus, electrically conductive. Each membrane defines a sensor element.

When a finger exerts a force on the sensor for sensing the fingerprint, the lines and ridges on the tip of the finger touch the sensor elements. No contact is made between the finger and the membranes of the sensor elements in the depressions between the lines and ridges on the tip of the finger. As such, when a finger is pressed on the present sensor, only those membranes on which a force is acting as a consequence of being touched by the ridges of the finger are deflected out of a quiescent position. By polling the sensor elements for the status of the membranes, a image of the line structure on the fingertip is obtained.

Electrical insulation is provided between the membranes and the substrate. The electrical insulation may be realized by pn-junctions or by insulating material arranged in the region of supporting locations between the substrate and the respective membranes.

Use of the present sensor provides a digital image of the fingerprint which is registered by reading out an electrical quantity which changes upon deflection of each membrane as a consequence of the effect of a force on the membranes. The sensor arrangement thus includes a read-out unit which reads out the electrical quantities from the corresponding membranes and stores this information in a memory.

In one example, a voltage is applied between the membrane and the substrate surface and changes in the voltage is the electrical quantity which is measured to obtain the image. In an alternate embodiment, the membrane and substrate are connected in a circuit and define a capacitance. A change in the capacitance between the membrane and the substrate surface is the electrical quantity which is measured for judging the status of each membrane.

When the voltage between the membrane and the substrate surface is the measured electrical quantity, then the surface of the substrate in the cavity between the substrate and the membrane is left uncovered so that electrical contact can be made between the membrane and the substrate surface when the membrane touches the surface as a consequence of a force applied on the membrane. The electrical contact causes a change in the voltage which is detected by the read-out unit.

By contrast, when a change in capacitance between the membrane and the substrate surface is to be used as the measured quantity, then a dielectric material is arranged between the membrane and the substrate. It is, therefore, advantageous to provide an insulating layer on the surface of the substrate in the cavity. Deflection of the membrane by fingertip pressure causes a change in capacitance which is detected by the read-out unit. In addition, this arrangement has the advantage that membranes which do not return to their quiescent position after the force exerted on the membrane is removed and which would, therefore, falsify the results of subsequent fingerprint images can be returned to the quiescent position by applying a corresponding electrical voltage as a reset function.

To guarantee adequate resolution in the sensing of fingerprints, the principles of the present invention provide that each of the membranes be small enough to sense the ridges and spaces of a fingerprint and that a great many such membranes be arranged in a regular array. For example, the membranes are of a generally rectangular shape having a length and width of each membrane between approximately 10 $\mu$m and 50 $\mu$m.

Preferably, the sensor elements of the present sensor arrangement are realized in a substrate of silicon. As such, it is within the scope of the present invention to provide a read-out unit which is integrated in the same substrate as the sensor arrangement. Such integration is advantageous due to the size of the sensor elements since the small dimensions required of the individual sensor elements make traditional wiring difficult. The electrical quantities which correspond to the status information for each and every sensor element can then be easily read out by the integrated read-out unit. An exemplary embodiment of the read-out unit comprises a shift register to which each of the membranes are connected via interconnects manufactured according to VLSI (very large scale integrated) microelectronic circuitry techniques. The shift register is easily integrated on the same silicon chip as the sensor arrangement.

It also lies within the scope of the present invention to enhance the sensitivity of the sensor arrangement to fingerprints by providing every membrane with a raised structure for defining a pressure point. For example, an elevation having a generally rectangular cross section and being of polysilicon may be provided in the middle of each membrane as a suitable structure for defining the pressure point for that membrane.

To avoid damage to the membranes which could result from movement of the finger parallel to the surface of the sensor arrangement, it is within the scope of the present invention to provide each sensor membrane with a stiffeninq means, such as thickened wall portions, for limiting lateral movement.

It is advantageous to protect the surface of the membrane arrangement with a flexible planar cover layer that completely covers all of the membranes. This reduces the risk of destroying the membranes due to lateral motion of the finger. Moreover, the deterioration of the operation of the sensor due to accumulations of dirt which would occur from touching of the sensor by finger tips is avoided. Furthermore, the planar covering layer facilitates cleaning of the sensor arrangement.

The present invention also provides a method for manufacturing a sensor arrangement which senses fingerprints. According to the present method, a layer of insulation, such as $Si_3N_4$ is applied onto a surface of a substrate. A semiconductor structure of $SiO_2$ is produced on the $Si_3N_4$ layer, the $SiO_2$ structure being structural elements arranged in a grid. Each of the individual $SiO_2$ structures are, for example, of cuboid shape. A polysilicon structure is applied over the $SiO_2$ structures so that a polysilicon structure forms a polysilicon structural element for each $SiO_2$ structure element. The polysilicon structural element completely covers the respective $SiO_2$ and laterally projects beyond it at at least two opposite sides. In one example, the polysilicon structure elements are rectangular in shape.

Subsequently, the $SiO_2$ structures are removed in an etching process which removes $SiO_2$ selectively and leaves behind polysilicon structure and the $Si_3N_4$ layer. The selective etching forms cavities between the polysilicon structures and the $Si_3N_4$ layer so that a membrane of polysilicon scans each of the cavities.

The above-described manufacturing method utilizes structuring steps which individually are known in the field of microelectronic manufacturing. This manufacturing method may also be referred to as micromechanical and as surface micromachining, since physical structures are formed on the surface of the substrate.

By using the manufacturing method according to the invention, it is possible to produce a sensor arrangement having a resolution in the range of approximately 20 μm. Due to the corresponding size of the finger tips, a sensor arrangement for sensing fingerprints should have a total area of approximately 2 cm². If the individual sensor elements have an edge dimension of 20 μm, are of a rectangular shape and are arrangement in a grid, the sensor arrangement for sensing a fingerprint requires approximately 500,000 sensor elements. Such a sensor arrangement may be manufactured using surface micromachining technology.

To improve the possibility of etching removal of the $SiO_2$ structure, it is within the scope of the invention to provide an auxiliary structure under the polysilicon structure. The auxiliary structure is selectively etchable to polysilicon. The auxiliary structure extends partially under the polysilicon structure beyond the $SiO_2$ structure and extends into the interspaces which are neither covered by the $SiO_2$ structure nor by the polysilicon structures. For example, the auxiliary structure comprises ridges which extend from the edge of the $SiO_2$ structural elements up to the edge of the corresponding polysilicon structure elements up to the edge of the polysilicon structural element which lies thereover. The ridges form etching channels via which the etching attack can occur at a number of locations during the etching step. This reduces the time required for the removal of the $SiO_2$ structure and, thus, the duration of the etching step on the surfaces of the $Si_3N_4$ layer which are not covered with $SiO_2$ structure.

The use of the auxiliary structures further enable the polysilicon structural elements to be used which overlap the $SiO_2$ structure element at all sides. It is thereby possible for the polysilicon structural elements to connect to the surface of the $Si_3N_4$ layer or to an auxiliary structure along a closed anchoring area which surrounds the $SiO_2$ structure like a frame. In this way, every $SiO_2$ structure element in the embodiment is completely closed off by the polysilicon structural element. The auxiliary structures are removed during the etching process by an etchant which is selective to leave behind polysilicon. Etching channels are formed so that the $SiO_2$ structural elements may be removed. The etching channels correspond to the shape of the auxiliary structures and proceed under the edge of the polysilicon structural elements up to the $SiO_2$ structural elements.

It is within the scope of the invention to provide structural elements of $SiO_2$ or from a combination of $SiO_2$ and $Si_3N_4$.

In a subsequent step after the $SiO_2$ structural elements have been removed, the etching channels may be closed in an oxidation step.

Other advantages and developments of the invention include providing a read-out unit in the form of a shift register which reads out the electrical quantities measured by the sensor elements in a column by column precession and writes this information into a memory.

The dimensions of the sensor for detecting fingerprint ridge provides that the polysilicon membrane is rectangular in shape within length of the edges lying in the range of approximately 10 through 50 μm. The membranes extend over a cavity which is of a heighth in the range of between approximately 0.1 and 1 μm perpendicular to the surface of the substrate and the polysilicon membranes have a thickness of approximately 0.2 to 2 μm in the perpendicular direction.

BRIEF DESCRIPTION OF THE DRAWINGS

The invention shall be set forth in greater detail hereinafter with reference to the drawings.

DETAILED DESCRIPTION OF THE PREFERRED EMBODIMENTS

Figure 1:
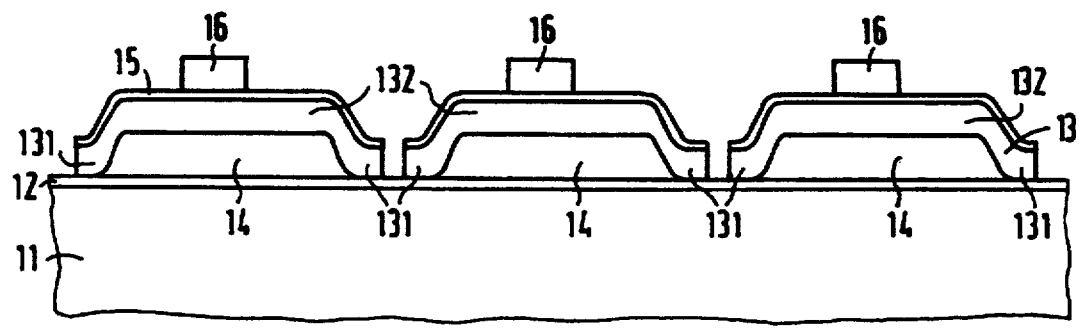
FIG. 1 is a cross section through a portion of a sensor arrangement for sensing fingerprints, including additional structures for defining pressure points of the sensors.

In FIG. 1 is shown an enlarged view of a portion of a sensor arrangement for sensing ridges on the finger tips which define fingerprints. The sensor arrangement includes a substrate 11 of, for example, n-doped silicon over the top surface of which is provided an insulating layer 12 of, for example, $Si_3N_4$. Polysilicon structures 13 are provided on the surface of the insulating layer 12, the polysilicon forming the structures 13 being n-doped. A plurality of the polysilicon structures 13 are arranged in a grid and are each, for example, rectangular in shape. Each polysilicon structural element 13 is in direct contact with the insulating layer 12 only at supporting locations 131. Portions of this polysilicon structural elements between the supporting locations 131 form membranes 132 which extend over cavities 14. In one embodiment, the supporting locations 131 surround the membrane portions 131 Like a frame so that the cavities 14 are closed by the supporting portions 131 and so that the membranes 132 are surrounded by supporting structures 131. The membrane 132 is generally rectangular in shape and is of a size of approximately 10 through 15 $\mu$m on edge. The polysilicon structure 13 has a thickness perpendicular to the surface of the substrate of approximately 0.8 $\mu$m.

In the illustrated embodiment, the polysilicon structures 13 are covered by a passivation layer 15 of, for example, $Si_3N_4$.

In order to define a pressure point for the sensor membranes, a structure 16 is provided on each membrane 132. The structure 16 is a rectangular element composed of, for example, polysilicon which is arranged roughly at the middle of each membrane 132.

The electrical quantity which is measured in the sensor arrangement shown is the change in capacitance between each membrane 132 and the substrate 11. The part of the insulating layer 12 which adjoins the cavity 14 acts as a dielectric in the capacitor. Since the only thing that is required to sense fingerprints is to determine whether membranes 132 are deflected out of its quiescent position or not, a predetermined threshold of capacitance is established and changes in capacitance which result in an upward transgression of the threshold are registered. The threshold lies between the capacitance value for membrane in the quiescent position and the value for membrane in the deflected position. In an exemplary embodiment a range of approximately 100 fF provides an adequate measuring precision for the fingerprint measurement.

Figure 2:
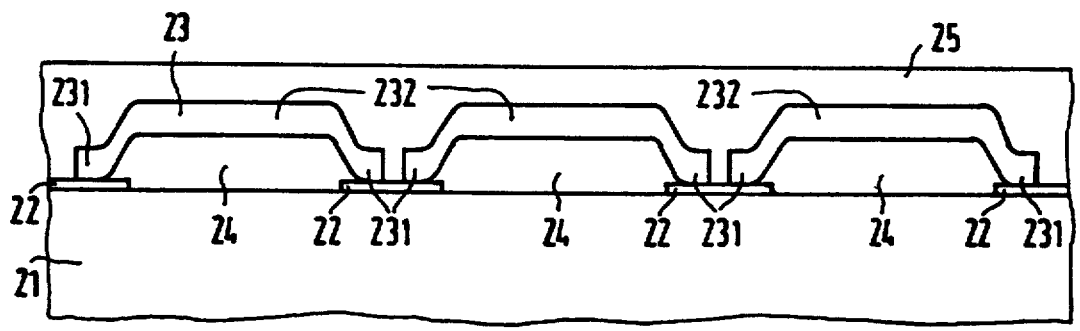
FIG. 2 is a cross section of a portion of a sensor arrangement of the invention, including a planarizing layer over the sensors.

Referring now to FIG. 2, an insulating structure 22 of, for example, $Si_3N_4$ is provided on the surface of a substrate 21 that is composed of, for example, n-doped silicon. The insulating structure 22 has a thickness of approximately 50 nm perpendicular to the surface of the substrate 21 in one example. A polysilicon structure 23, which is n-doped in one example, is provided, the polysilicon structures being arranged as a grid and, for example, being rectangular The polysilicon structural elements 23 are each firmly joined to the insulating structure 22 at supporting locations 231 and the portion of each polysilicon structural element 23 between the supporting locations 231 forms a membrane 232 extending over a cavity 24. The surface of the substrate 21 is at least partially exposed in the cavity 24. In other words, an opening through the insulating structure 22 is provided at each of the cavities 24. Each of the cavities 24 is completely surrounded by the supporting locations 231 of the polysilicon structural elements 23. In other words, the supporting locations 231 of the polysilicon structural elements 23 form a closed supporting surface that surrounds respective ones of the cavities 24 like a frame.

In this embodiment, the polysilicon structure 23 has a thickness of, for example, 0.8 $\mu$m and the edge of each membrane 232 has an edge length of, for example, 10 through 50 $\mu$m.

Over the surface of the sensor structure is a planarizing layer 25 which is composed of, for example, BPSG. The planarizing layer 25 protects the surface of the polysilicon structures 23 against destruction during lateral movements of the finger tip and against contamination of the sensor. The planarizing layer also serves as a passivation layer for the surface of the sensor.

Figure 3:
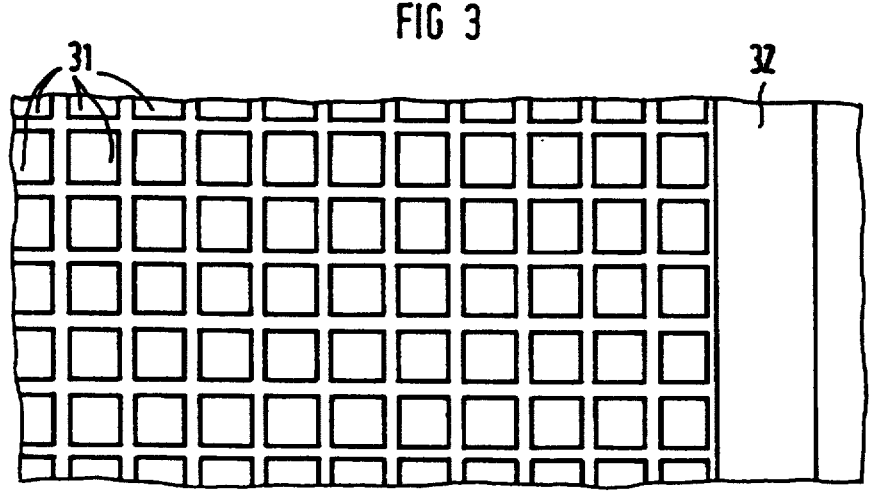
FIG. 3 is a plan view of a portion of a sensor arrangement for sensing fingerprints according to the invention and including a shift register for reading out information from the sensor elements.

A plan view of a sensor arrangement according to the present invention is shown in FIG. 3. The sensor elements 31 are arranged in grid-like fashion on the surface of the substrate. The sensor elements 31 each have a membrane of polysilicon that stretches over a cavity and is firmly joined to the substrate at at least two supporting locations via respective insulating structures. Preferably, the membranes are joined to the insulating structures around its entire edge.

A read-out unit adjacent arrangement of sensor elements is provided on the same substrate and electrical connections between the read-out unit and each of the membranes is provided on the substrate as well. The read-out unit 32 is a shift register via which the sensor arrangement signals are read out column-by-column.

Figure 4:
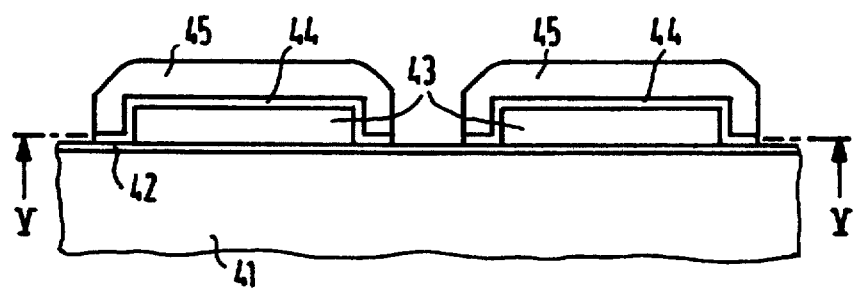
FIG. 4 is a cross section through layer structures producing during manufacture of a sensor arrangement according to the invention.
Figure 5:
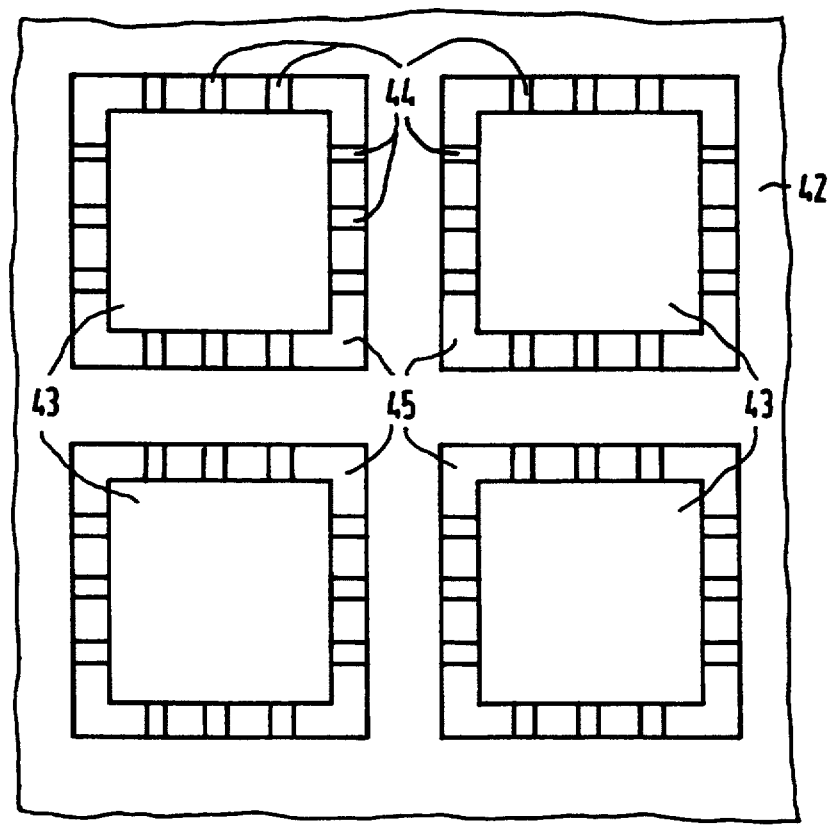
FIG. 5 is a cross section along the line V—V of FIG. 4 showing the layer structure of the invention.

According to a method of the present invention for manufacturing the sensor arrangement for sensing fingerprints, an insulating 42 as shown in FIG. 4 is applied to a substrate 41. The insulating layer 42 is composed of, for example, $Si_3N_4$ and is of a thickness of approximately 50 nm. The substrate 41 is composed of n-doped silicon. On the surface of the insulating layer 42 is produced $SiO_2$ structures 43 which are generated by applying a surface-wide film of $SiO_2$ and subsequently structuring the $SiO_2$ to form cuboid structures 43 of $SiO_2$ arranged in a grid-like pattern. The cuboid $SiO_2$ structures 43 are of a length and width of approximately 10 through 50 m. After shaping of the $SiO_2$ structures 43, the structures 43 have a thickness perpendicular to the surface of the substrate of, for example, to 0.8 $\mu$m.

Auxiliary structures 44 of $SiO_2$ are applied on the surface of the $SiO_2$ structures 43. The auxiliary structures 44 extend laterally beyond the outer boundaries of the $SiO_2$structures 43 and have a thickness of, for example, 50 nm perpendicular to the surface of the substrate 41.

A polysilicon structure 45 which is of n-doped polysilicon is produced as a surface-wide deposition layer and then is shaped by subsequent structuring of a polysilicon layer. The polysilicon structures 45 are rectangular structural elements arranged in a grid-like pattern and completely covering the SiO2 structural elements 43. That part of the polysilicon structural element 45 which extends laterally beyond the outer edges of the SiO2 structural element 43 is connected to the insulating layer 42 or to the auxiliary structure 44 and so forms an anchoring or mounting surface for the polysilicon structure 45. The anchoring surface surrounds each of the SiO2 structural elements 43 as a closed frame.

As a subsequent step, the auxiliary structures 44 which are of $SiO_2$ are removed in an etching process which leaves behind the insulating layer $Si_3N_4$ and the polysilicon structure. The etching process is preferably a wet chemical application of hydrofluoric acid. Since the auxiliary structure 44 forms ridges at least at the portion thereof which extends beyond the edges of the $SiO_2$ structure 43, the etching results in the formation of etching channels which extend under the anchoring surfaces of the polysilicon structural elements 45 up to the corresponding $SiO_2$ structural elements 43. By continuing the etching process, the etchant attacks the SiO$_2$ structure 43 through the etching channels. This enables the SiO$_2$ structure 43 to be completely removed and thereby forms cavities. These cavities are spanned by the polysilicon structural elements 45. Surrounding the cavities is the anchoring surfaces of the polysilicon structural elements 45 where they are firmly joined to the insulating layer 42. The part of the polysilicon structural elements 45 which stretch over this cavity forms a membrane and thus defines the individual sensor elements of the sensor arrangement.

Since the polysilicon structures 45 overlap the lateral extensions of the auxiliary structures 44, etching of the SiO$_2$ of which the auxiliary structures are formed creates channels which lead into the SiO$_2$ structure 43. These channels which lead into the cavities resulting from the removal of the SiO$_2$ structures 43 are closed by further steps for finishing the sensor arrangement, including oxidation or application of a planarizing layer.

When the status of each membrane is to be identified by measuring the voltage between the substrate surface and the membrane, the insulating layer 42 is structured with openings before the SIO$_2$ structures 43 are applied so that the SiO$_2$ structures 43 lie directly on the surface of the substrate 41. This leaves the openings as shown in FIG. 2.

Although other modifications and changes may be suggested by those skilled in the art, it is the intention of the inventors to embody within the patent warranted hereon all changes and modifications as reasonably and properly come within the scope of their contribution to the art.

We claim:

1. A sensor for sensing fingerprints, comprising:
   a substrate of a semiconductor material having doping at a surface of said substrate, semiconductor material of said substrate being silicon;
   membranes of doped semiconductor material arranged in a grid on said surface of said substrate, said membranes being shaped to define cavities between said surface of said substrate and said membranes and being joined to said substrate at supporting locations, said membranes being of polysilicon;
   means for electrically insulating said membranes from said substrate; and
   a read-out unit connected to said substrate and said grid-shaped membranes to read out changes in an electrical quantity due to mechanical influences on said membranes when power is supplied to said sensor.

2. A sensor as claimed in claim 1, wherein said means for electrically insulating comprises insulating structures between said surface of said substrate and said membranes at said supporting locations.

3. A sensor as claimed in claim 1, further comprising:
   an insulating layer on said surface of said substrate at said cavities.

4. A sensor as claimed in claim 1, wherein said read-out unit comprises a shift register connected to read out data corresponding to changes in said electrical quantity from said grid of membranes column-by-column, and further comprising:
   a memory connected to said shift register into which said data is stored.

5. A sensor as claimed in claim 1, wherein said membranes each have a portion of a generally rectangular shape lying substantially parallel to said surface of said substrate, said portion having a length and a width in a range of approximately 10 to 50 $\mu$m.

6. A sensor as claimed in claim 1, further comprising:
   a structure on substantially each of said membranes to define a pressure point for each membrane.

7. A sensor as claimed in claim 1, wherein said membranes are stiffened against movement in a lateral direction.

8. A sensor as claimed in claim 1, further comprising:
   a planarizing layer covering said membranes and forming a substantially planar surface.

9. A sensor as claimed in claim 1, wherein said membranes define a cavity of a height of approximately 0.1 to 1 $\mu$m between said membrane and said surface of said substrate.

10. A sensor as claimed in claim 1, wherein said membranes are of a thickness of between approximately 0.2 and 2 $\mu$m in a direction perpendicular to said surface of said substrate.

11. A method for manufacturing a sensor arrangement for sensing fingerprints, comprising the steps of:
    applying a layer of insulating material onto a surface of a substrate;
    applying a layer of an etchable material onto said layer of insulating material;
    etching said layer of etchable material to form structure elements in a grid on said surface and to reveal said insulating material between said structure elements;
    depositing a semiconductor layer onto said grid of structure elements;
    etching said semiconductor layer to form separate semiconductor structures covering each of said structure elements and extending beyond said structure elements at two opposite sides;
    removing said structure elements to form cavities between said semiconductor structures and said insulating material so that a membrane of said semiconductor structure extends over said cavities; and
    applying auxiliary structures of an etchable material extending beyond edges of said structure elements before said step of depositing said semiconductor material so that said step of removing said structure elements proceeds by removing said auxiliary structures to form etching channels between said semiconductor material and said insulating material through which said structure elements are removed.

12. A method as claimed in claim 11, further comprising the step of:
    doping said semiconductor layer after said step of depositing.

13. A method as claimed in claim 11, further comprising the step of:
    removing said insulating material at regions before said step of depositing said semiconductor layer, and
    etching said semiconductor layer away at said regions.

14. A method as claimed in claim 11, wherein said step of applying said layer of said etchable material deposits a layer of SiO$_2$ of a thickness in a range of approximately 0.1 to 1 $\mu$m;
    said step of depositing said semiconductor layer deposits a layer of polysilicon of a thickness in a range of 0.2 to 2 $\mu$m;
    said step of etching said layer of said etchable material to form said structure elements form structure elements of length and width in a range of approximately 10 to 50 μm so that after said step of removing said structure elements said separate semiconductor structures span cavities of approximately 10 to 50 μm.

15. A method as claimed in claim 11, wherein said step of applying said auxiliary structures applies $SiO_2$.

16. A method as claimed in claim 11, wherein said step of applying said auxiliary structures applies $Si_3N_4$.

17. A method as claimed in claim 11, wherein said step of applying said auxiliary structures applies auxiliary structures of a thickness perpendicular to said surface of said substrate of between approximately 20 to 200 nm.

18. A method as claimed in claim 11, wherein said step of etching said semiconductor layer to form said separate semiconductor structures etches said separate semiconductor structures to overlap edges of said structure elements and join said insulator material and said auxiliary structures in a frame like shape.

19. A method as claimed in claim 11, further comprising the step of:
   etching said layer of said insulating material to form openings to said substrate;
   wherein said step of etching said layer of etchable material to form structure elements forms said structure elements over said openings.

* * * * *